(12) United States Patent
Wang et al.

(10) Patent No.: US 9,110,810 B2
(45) Date of Patent: Aug. 18, 2015

(54) MULTI-LEVEL INSTRUCTION CACHE PREFETCHING

(75) Inventors: Nicholas Wang, Saratoga, CA (US); Jack Hilaire Choquette, Palo Alto, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 697 days.

(21) Appl. No.: 13/312,962

(22) Filed: Dec. 6, 2011

(65) Prior Publication Data

US 2013/0145102 A1    Jun. 6, 2013

(51) Int. Cl.
*G06F 13/00* (2006.01)
*G06F 13/28* (2006.01)
*G06F 12/08* (2006.01)
*G06F 9/38* (2006.01)

(52) U.S. Cl.
CPC .......... *G06F 12/0862* (2013.01); *G06F 9/3802* (2013.01); *G06F 9/3875* (2013.01); *G06F 2212/6026* (2013.01)

(58) Field of Classification Search
CPC .............. G06F 9/3802; G06F 12/0862; G06F 2212/6026
USPC ........................................... 711/137, E12.057
See application file for complete search history.

(56) References Cited

U.S. PATENT DOCUMENTS

| 2006/0149904 A1* | 7/2006 | Mowry .......................... 711/137 |
| 2008/0320228 A1* | 12/2008 | Brunheroto et al. .......... 711/137 |
| 2009/0077321 A1* | 3/2009 | Diefendorff ................... 711/137 |
| 2009/0259813 A1* | 10/2009 | Yasufuku ....................... 711/122 |

* cited by examiner

*Primary Examiner* — Edward Dudek, Jr.
(74) *Attorney, Agent, or Firm* — Artegis Law Group, LLP

(57) ABSTRACT

One embodiment of the present invention sets forth an improved way to prefetch instructions in a multi-level cache. Fetch unit initiates a prefetch operation to transfer one of a set of multiple cache lines, based on a function of a pseudorandom number generator and the sector corresponding to the current instruction L1 cache line. The fetch unit selects a prefetch target from the set of multiple cache lines according to some probability function. If the current instruction L1 cache 370 is located within the first sector of the corresponding L1.5 cache line, then the selected prefetch target is located at a sector within the next L1.5 cache line. The result is that the instruction L1 cache hit rate is improved and instruction fetch latency is reduced, even where the processor consumes instructions in the instruction L1 cache at a fast rate.

20 Claims, 8 Drawing Sheets

MULTI-LEVEL INSTRUCTION CACHE PREFETCHING

BACKGROUND OF THE INVENTION

1. Field of the Invention

The present invention generally relates to computer architectures and, more specifically, to multi-level instruction cache prefetching for multithreaded processors.

2. Description of the Related Art

A common practice in high-speed computing systems such as multithreaded processors is to utilize a multi-level cache system to reduce latency during instruction fetching. The first level cache level is called the level one (L1) cache and is typically a small, high speed memory closely associated with the processor. The L1 cache usually has the lowest memory access latency of the various cache levels and contains instructions that the processor accesses frequently or is likely to access in the near future. Increased performance is achieved when instructions are stored in the L1 cache at or before the time the instructions are accessed by the processor. A level two (L2) cache is typically a memory that is larger and slower than the L1 cache, but faster than system memory. Some cache systems may employ an intermediate level (L1.5) cache between the L1 and L2 caches with latency and size somewhere between those of the L1 and the L2 caches.

Conventionally, when the processor accesses a new instruction, the fetch unit within the processing system first looks for the instruction in the L1 cache. If there is an L1 cache hit (i.e., the instruction is, in fact, present in the L1 cache), then the instruction is transferred, and the memory access operation is executed. If the instruction is not in the L1 cache, then there is an L1 cache miss, and the fetch unit has to attempt to find the instruction in the L1.5 cache. If there is a miss in the L1.5 cache, then the fetch unit next looks for the instruction in the L2 cache, and, in the event of an L2 cache miss, the system memory is searched lastly.

When instruction accesses proceed in a predictable manner, the L1 cache hit rate may be improved by prefetching cache lines from the L1.5 cache and transferring those cache lines to the L1 cache before the processor attempts to access the corresponding instructions from the L1 cache. A processor predictably accesses instructions at successive memory address locations unless a branch occurs to a non-sequential memory location. Therefore, if the processor is accessing locations at a particular L1 cache line, then the fetch unit typically prefetches from the L1.5 cache a cache line containing the memory locations immediately following the current L1 cache line. This next cache line may be called a prefetch target and is located within the L1.5 cache immediately following the L1.5 cache addresses corresponding to the current L1 cache line. If the prefetch operation is successful, then by the time the processor reaches the memory address locations immediately following the current L1 cache line, that next L1 cache line has already been prefetched from the L1.5 cache and stored within the faster L1 cache. In this fashion, successful prefetching increases the hit rate within the L1 cache. Sequential memory accesses typically result in a cache hit. A similar technique may be employed at any level within the cache hierarchy. For example, the L1.5 cache may prefetch lines from the L2 cache, and the L2 cache may prefetch lines from system memory.

In one prefetch approach, a processor may access two instructions at a time from the L1 cache, where each L1 cache line contains eight instructions. Such a technique is referred to as a "sectored" access, where each pair of instructions represents a "sector" within the L1 cache line, and each L1 cache line has four sectors. The fetch unit monitors which sector the processor accesses at any given time and uses this information to prefetch the next L1 cache line. Again, if the prefetch operation is successful, then by the time the processor consumes the last sector in the current L1 cache line, the next L1 cache has already been prefetched from the L1.5 cache and stored within the L1 cache.

One drawback of this conventional approach to prefetching instructions is that a faster processor may transfer an entire L1 cache line (containing eight instructions in this example) at one time. In such a case, the fetch unit is not able to monitor processor accesses by sector in order to prefetch additional cache lines from the L1.5 cache. Another drawback of this approach is that a faster processor may consume instructions at such a high rate, that the fetch unit is not able to prefetch L1 cache lines quickly enough, causing an increase in cache misses. To counter this second problem, the fetch unit may prefetch two L1 cache lines ahead from the L1.5 cache in an attempt to fill the L1 cache lines before the processor accesses those lines. However, in the event of a branch to a non-sequential location, a processor typically ends up incurring two or more cache misses, one for each of the first two cache lines at the branch target, for every branch executed rather than just one cache miss. Consequently, cache misses are increased, thereby decreasing overall performance.

As the foregoing illustrates, what is needed in the art is a more optimized way to prefetch instructions in a system having a multi-level instruction cache hierarchy.

SUMMARY OF THE INVENTION

One embodiment of the present invention sets forth a computer-implemented method for pre-fetching cache lines. A fetch unit determines a memory location within a first cache. The fetch unit generates a pseudo-random number. The fetch unit then selects a first cache line within the first cache associated with the memory location and the pseudo-random number. The fetch unit locates a first sector within a first cache line within a second cache, where the first sector corresponds to the first cache line within the first cache. The fetch unit then transfers the first sector to the first cache line within the first cache.

One advantage of the disclosed technique is that L1 cache lines are transferred from the L1.5 cache in such a manner that the instruction L1 cache contains multiple L1 cache lines following the current execution point of the processor. The result is that the instruction L1 cache hit rate is improved and instruction fetch latency is reduced, even where the processor consumes instructions in the instruction L1 cache at a fast rate.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
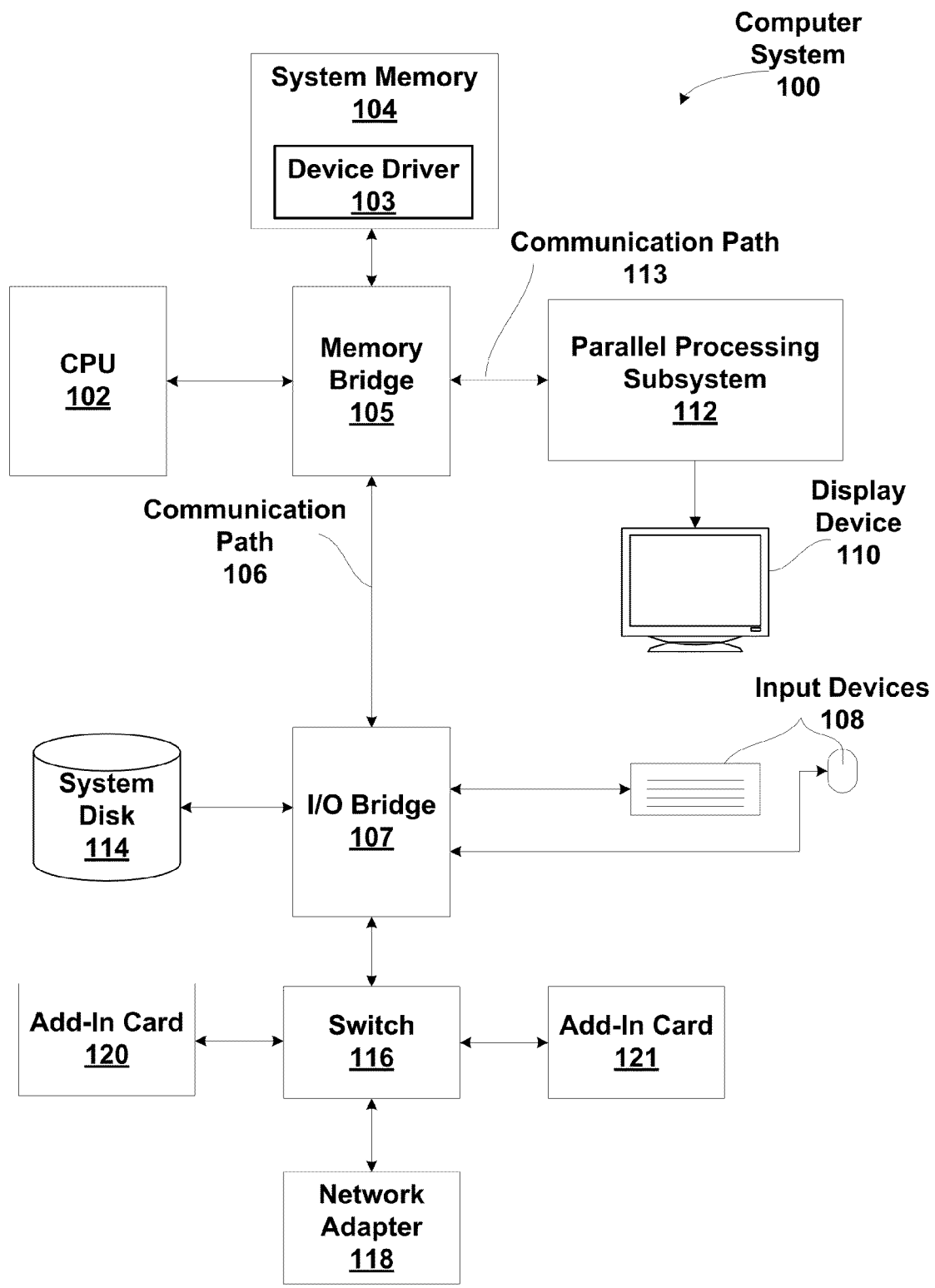
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
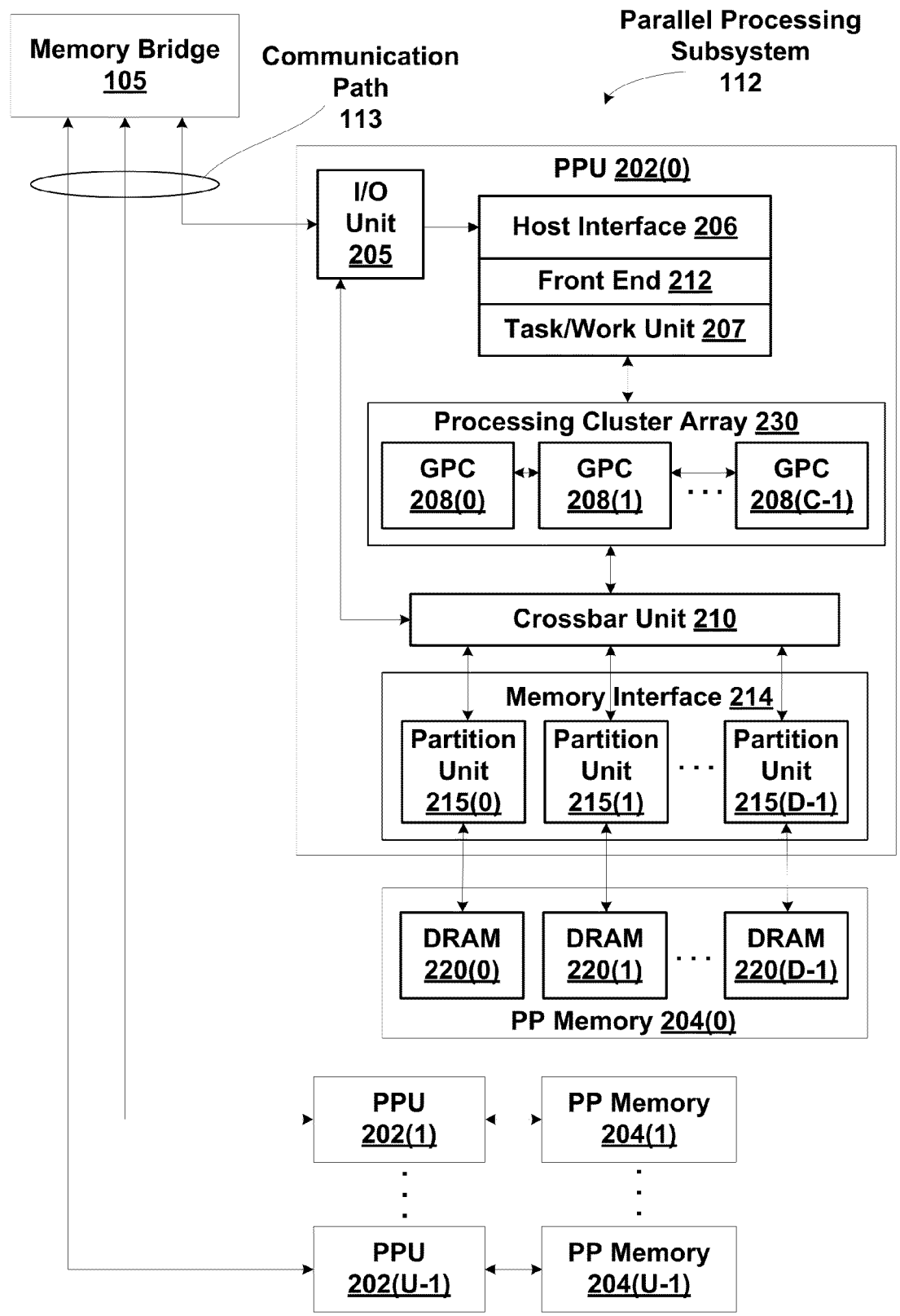
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing system 112 may output data to display device 110 or each PPU 202 in parallel processing system 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip.

PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
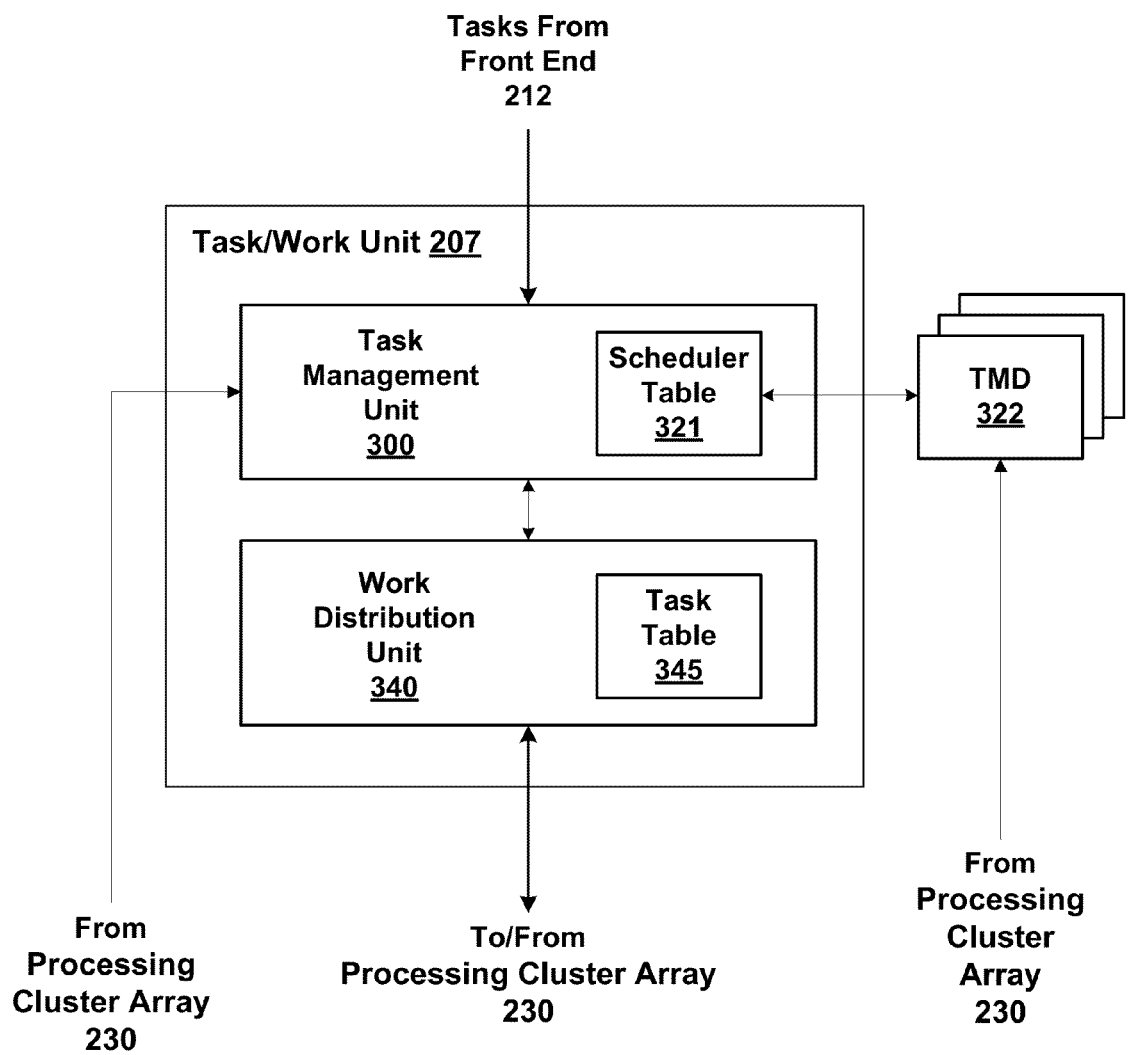
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to a list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
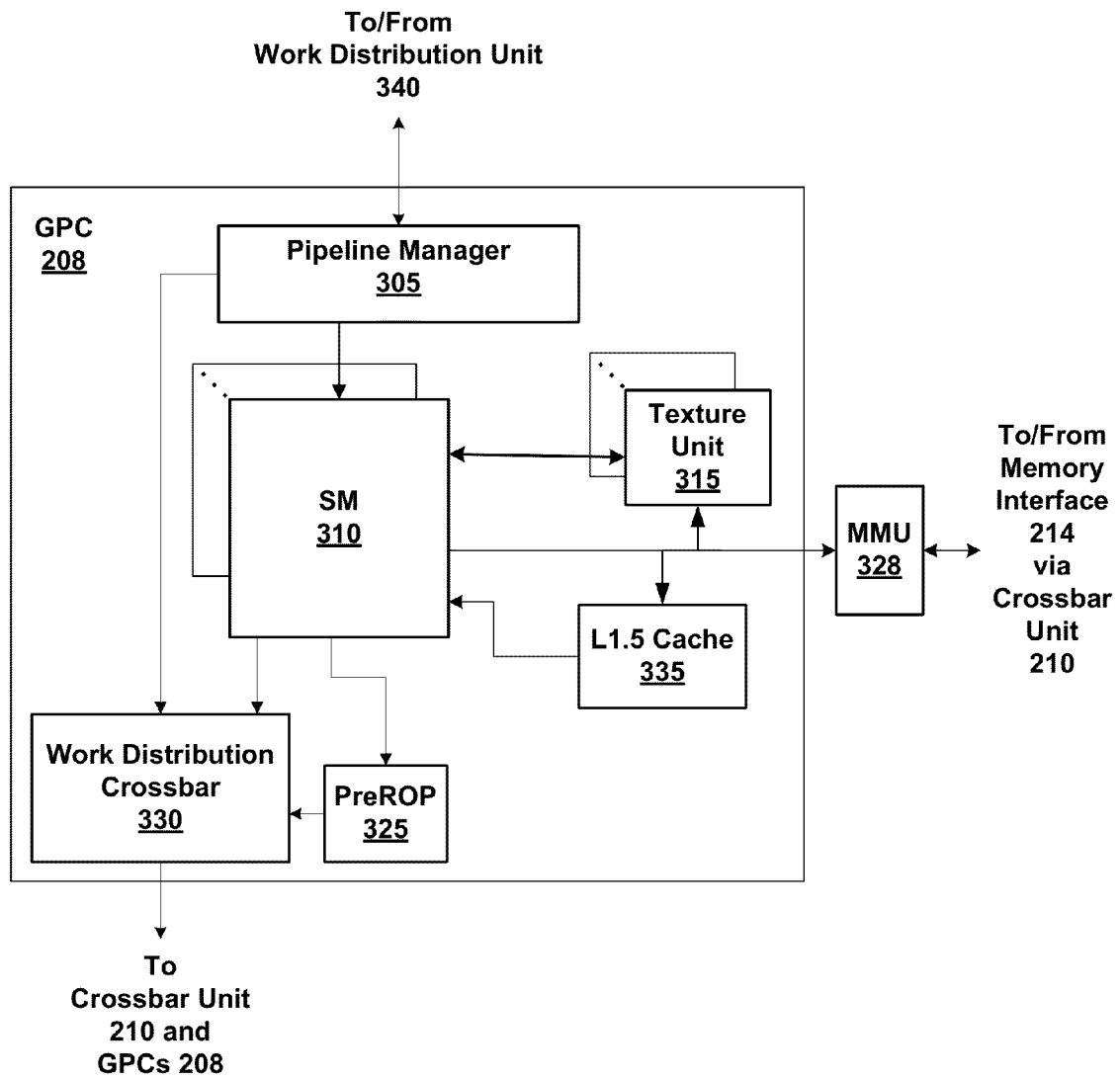
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
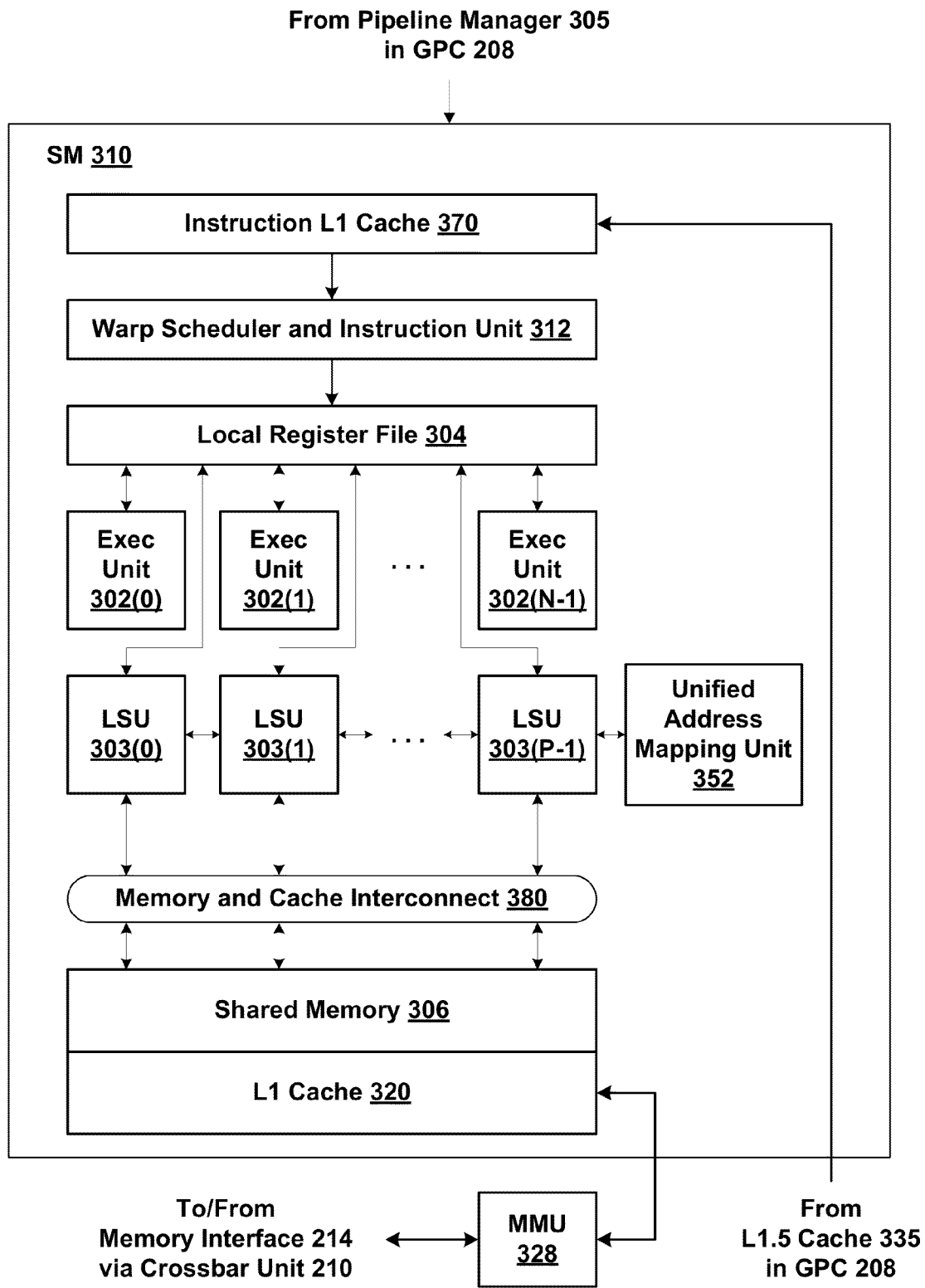
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Instruction Prefetch in a Multi-level Instruction Cache

Figure 4:
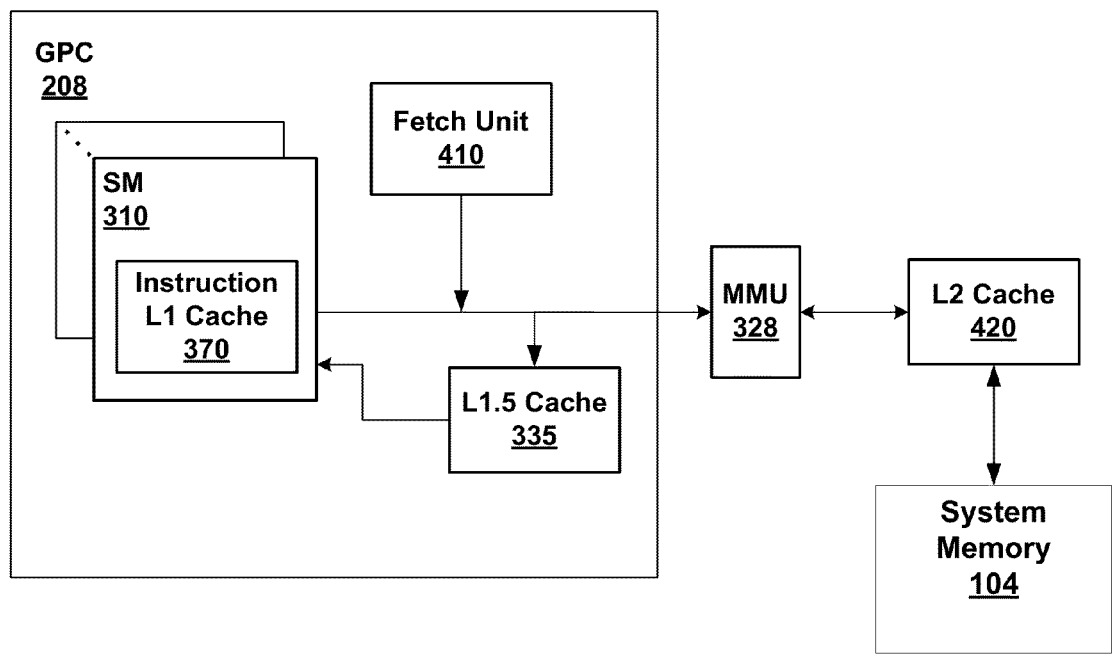
FIG. 4 is a block diagram of a multi-level instruction cache, according to one embodiment of the present invention.

FIG. 4 is a block diagram of a multi-level instruction cache, according to one embodiment of the present invention. As shown, the multi-level instruction cache includes an instruction L1 cache 370, an SM 310, an L1.5 cache 335, a GPC 208, fetch unit 410, an MMU 328, an L2 cache 420, and system memory 104.

The instruction L1 cache 370 is configured to receive instructions accessed by the processors within the SM 310. As is well known, performance is enhanced when a processor is able to fetch instructions from the instruction L1 cache 370. The fetch unit 410 transfers cache lines into the instruction L1 cache 370 and the L1.5 cache 335 from higher cache levels or from system memory 104. If the next instruction accessed by the processor is not resident in the instruction L1 cache 370, then this condition constitutes a cache miss, and the fetch unit 410 fetches the instruction from a higher cache level or from system memory 104. Once the cache line containing the instruction is found, the fetch unit 410 transfers the cache line to the instruction L1 cache 370, and the processor executes the retrieved instruction. If, however, the next instruction accessed by the processor is resident in the instruction L1 cache 370, then this condition constitutes a cache hit, and the processor retrieves the accessed instruction from the instruction L1 cache 370. In such a case, the instruction is not fetched from a higher cache level, and the fetch unit 410 may instead initiate a "prefetch" operation to transfer a prefetched cache line into the instruction L1 cache 370. Such prefetch operations are desirable because the fetch unit 410 transfers cache lines to the instruction L1 cache 370 that have a high probability of being accessed prior to the time the processor actually accesses those cache lines. As a result, cache misses are reduced and processor performance is accordingly improved.

The L1.5 cache 335 within the GPC 208 is configured to receive and hold instructions, uniform data, and constant data fetched via the MMU 328. When the fetch unit 410 executes a fetch operation or a prefetch operation, the fetch unit 410 first attempts to retrieve the desired L1 cache line from a sector within an L1.5 cache 335 line. A sector is a subdivision of an L1.5 cache 335 line corresponding to an instruction L1 cache 370 line. In the case of an L1.5 cache 335 hit, the fetch unit 410 transfers the desired cache line from the L1.5 cache 335 to the instruction L1 cache 370. In the case of an L1.5 cache 335 miss, the fetch unit 410 initiates a request to the MMU 328 to retrieves the cache line from the L2 cache 420 or (in the case of an L2 cache miss) from system memory 104.

Again, the fetch unit 410 advantageously prefetches cache lines from the L1.5 cache 335 in order to increase the probability that instructions accessed by the processor are resident in the instruction L1 cache 370 before the processor requests the instructions from system memory 104. For example, if the processor is executing an instruction within a current cache line in the instruction L1 cache 370, then the fetch unit 410 prefetches the cache line immediately following the current cache line. Under certain conditions, the fetch unit 410 prefetches multiple cache lines following the current cache line. The number of cache lines to prefetch is a function of, among other things, the speed of the processor, the number of thread groups executing in the SM 310, the number of instructions in each instruction L1 cache 370 line and L1.5 cache 335 line, and the latency for an L1.5 cache 335 hit and an L1.5 cache 335 miss. The fetch unit 410 transfers one of the multiple cache lines in any given prefetch operation. The cache line to be transferred in a given prefetch operation is called the "prefetch target." The fetch unit 410 randomly selects the prefetch target from among the multiple cache lines according to some probability function. Over a period of several prefetch operations, the fetch unit 410 is able to transfer the multiple cache lines to the instruction L1 cache 370. In addition, the fetch unit 410 may also trigger an early prefetch operation for the next L1.5 cache 335 line where there is a significant difference between the L1.5 cache 335 hit latency and the L1.5 cache 335 miss latency.

Figure 5:
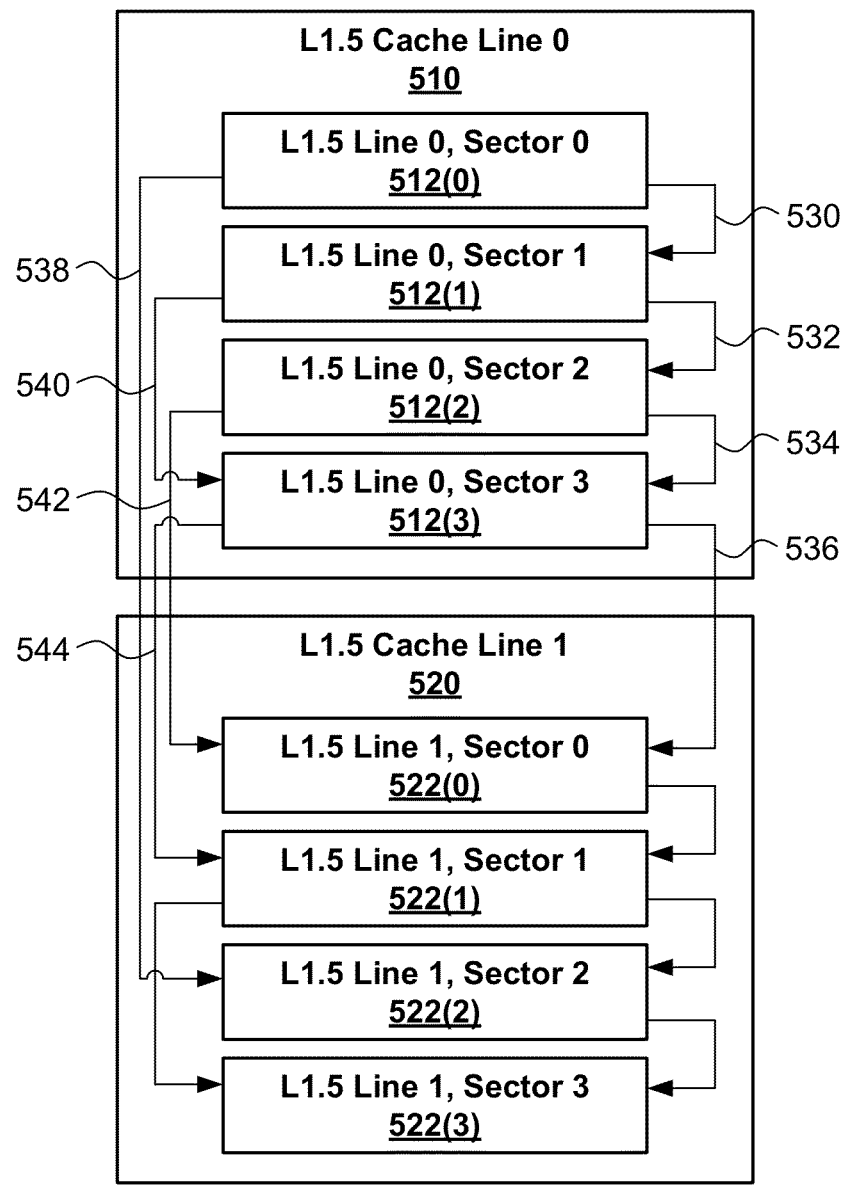
FIG. 5 illustrates a portion of the L1.5 cache, according to one embodiment of the present invention.

FIG. 5 illustrates a portion of the L1.5 cache 335, according to one embodiment of the present invention. As shown, the L1.5 cache 335 includes L1.5 cache line 0 510, L1.5 line 0 sectors 512, L1.5 cache line 1 520, and L1.5 line 1 sectors 522.

L1.5 cache line 0 510 represents a typical cache line within the L1.5 cache 335. Fetch unit 410 within the SM 310 determines when an attempted fetch operation or prefetch operation to the instruction L1 cache 370 results in a cache miss, in which case the fetch unit 410 looks in the L1.5 cache 335 for the accessed instruction. If the instruction is located at an address that corresponds to a location within L1.5 cache line 0 510, then the fetch unit 410 determines which portion of L1.5 cache line 0 510 to transfer to the instruction L1 cache 370.

L1.5 line 0 sectors 512 are subdivisions (sectors) of L1.5 cache line 0 510, where each subdivision (sector) is typically the size of an instruction L1 cache 370 line. When the fetch unit 410 initiates a fetch operation or prefetch operation for a cache line that resides within L1.5 cache line 0 510, the fetch unit 410 determines in which L1.5 line 0 sector 512 the accessed instruction resides. The fetch unit 410 then transfers that L1.5 line 0 sector 512 to the instruction L1 cache 370. The sectors are arranged in order of consecutively increasing addresses, where L1.5 line 0 sector 0 512(0) is followed by L1.5 line 0 sector 1 512(1), which is in turn followed by L1.5 line 0 sector 2 512(2), and so on.

L1.5 cache line 1 520 represents another typical cache line within the L1.5 cache 335 corresponding to memory locations immediately following L1.5 cache line 0 510. L1.5 cache line 1 520 is likewise subdivided into sectors such that L1.5 line 1, sector 0 522(0) immediately follows L1.5 line 0, sector 3 512(3), L1.5 line 1, sector 1 522(1) immediately follows L1.5 line 1, sector 0 522(0), and so on.

During a prefetch operation, the fetch unit 410 determines which sector within the L1.5 cache 335 to transfer to the instruction L1 cache 370. This sector is referred to herein as a "prefetch target." The fetch unit 410 selects the prefetch target as a function of two values. The first value is a random number or an apparently random number such as one generated by a pseudo-random number generator (not shown). The random number is used to select which one of the multiple instruction L1 cache 370 lines (as represented by corresponding sectors within the L1.5 cache 335) to transfer in the current prefetch operation. The random number is designed to select one of the multiple instruction L1 cache 370 lines according to some probability function. The second value is the sector location within the L1.5 cache 335 of the current instruction L1 cache 370 line. When the current instruction L1 cache 370 line is from sector 0 of the corresponding L1.5 cache 335 line, the fetch unit 410 advantageously selects a prefetch target in the next L1.5 cache 335 line, for at least some values of the random number.

In one example, each instruction L1 cache 370 line could consist of 64 bytes containing 8 instructions of 8 bytes each. Each L1.5 cache 335 line could consist of 256 bytes containing 32 instructions of 8 bytes each. In such a case, an L1.5 cache 335 line is four times larger than an instruction L1 cache 370 line. Each L1.5 cache 335 line is divided into four sectors where each sector is the size of one instruction L1 cache 370 line. Further, in this example, the processor could achieve the desired level of performance when the instruction L1 cache 370 maintains two cache lines ahead of the current processor's instruction address. The fetch unit 410 randomly transfers the cache line that is either one or two instruction L1 cache 370 lines ahead (that is, one or two L1.5 cache 335 sectors ahead), according to some probability function. To determine the prefetch target relative to the memory location of the current instruction, the following offsets set forth in Table 1 could be implemented:

TABLE 1

| L1.5 Sector | Relative Prefetch Target Address | |
| --- | --- | --- |
| | Random Number = 0 | Random Number = 1 |
| 0 | +384 Bytes | +64 Bytes |
| 1, 2, or 3 | +128 Bytes | +64 Bytes |

The prefetch target is determined on the basis of a random number and the position of the current instruction L1 cache 370. In this example, the prefetch target is either one or two instruction L1 cache 370 lines ahead. One bit from the random number generator is utilized to determine which of the two lines to be prefetched in any given prefetch operation. If the selected bit within the random number is equal to 1, then the prefetch target is one instruction L1 cache 370 line ahead (64 bytes) of the current instruction L1 cache 370 line, regardless of the L1.5 cache 335 sector corresponding to the current instruction L1 cache 370 line. If the selected bit within the random number is equal to 0, then the prefetch target depends on the position of the L1.5 cache 335 sector corresponding to the current instruction L1 cache 370 line. The prefetch target is two instruction L1 cache 370 lines ahead (+128 bytes) of the current instruction L1 cache 370 line, when the current instruction L1 cache 370 line is from sector 1, 2, or 3 of the corresponding L1.5 cache 335 line. If the current instruction L1 cache 370 line is from sector 0 of the corresponding L1.5 cache 335 line, then the prefetch target is six instruction L1 cache 370 lines (+384 bytes) ahead. Careful selection of the relative prefetch target address values in Table 1 could result in a steady state where the fetch unit 410 prefetches the various instruction L1 cache 370 lines with equal frequency.

The purpose of selecting a distant prefetch target when the current instruction L1 cache 370 line is from sector 0 is to force an early prefetch operation for the next L1.5 cache 335 line. The processor typically accesses instructions in sequentially increasing memory addresses until a branch is taken. The sectors in the L1.5 cache 335 line represent increasing memory addresses. Thus, the instructions in sector 0 are typically executed first, followed by the instructions in sectors 1, 2, and 3 in succession. After the instructions in sector 3 are processed, the instructions in sector 0 of the next L1.5 cache 335 line are processed, and so on. Further, all sectors within a given L1.5 cache 335 line are resident in the L1.5 cache 335 at the same time. However, if sector 0 of the following L1.5 cache 335 line is not resident, then the sector is fetched from the L2 cache 420 or system memory 104, with typically longer latency. Therefore, the fetch unit 410 advantageously initiates a prefetch operation for the next L1.5 cache 335 line as early as possible in the execution of the current L1.5 cache 335 line.

The above technique is illustrated in FIG. 5. When the selected bit from the random number generator is 1, the prefetch target is one instruction L1 cache 370 line (one L1.5 cache 335 sector) ahead of the current instruction regardless of the sector number. Accordingly, if the current instruction L1 cache 370 line corresponds to L1.5 line 0, sector 0 512(0), then the prefetch target 530 is L1.5 line 0, sector 1 512(1). Correspondingly, L1.5 line 0, sector 1 512(1) generates a prefetch target 532 of L1.5 line 0, and sector 2 512(2), and L1.5 line 0, sector 2 512(2) generates a prefetch target 534 of L1.5 line 0, sector 3 512(3). If the current sector is L1.5 line 0, sector 3 512(3), then the prefetch target 536 is the first sector of the next L1.5 cache 335 line, which is L1.5 line 1, sector 0 522(0). When the selected bit from the random number generator is 0, the prefetch target is either two or six instruction L1 cache 370 lines (two or six L1.5 cache 335 sectors, respectively) ahead of the current instruction depending on the sector number. Accordingly, if the current instruction L1 cache 370 line corresponds to L1.5 line 0, sector 1 512(1), then the prefetch target 540 is L1.5 line 0, sector 3 512(3). Correspondingly, L1.5 line 0, sector 2 512(2) generates a prefetch target 542 of L1.5 line 1, and sector 0 522(0), and L1.5 line 0, sector 3 512(3) generates a prefetch target 544 of L1.5 line 1, sector 1 522(1). An exception occurs where the current position the current instruction L1 cache 370 line corresponds to sector 0 of the current L1.5 cache 3335 line. In this case, the prefetch target is six sectors ahead, forcing an early prefetch operation for the next L1.5 cache 335 line. Accordingly, if the current instruction L1 cache 370 line corresponds to L1.5 line 0, sector 0 512(0), then the prefetch target 538 is L1.5 line 1, sector 2 522(2).

Although the preceding discussion is in the context of an instruction cache, the techniques described herein apply equally to any type of cache including, without limitation, instruction caches, data caches, texture caches, or caches with multiple content types such as a combined instruction/data cache. In addition, the techniques described herein may be utilized in a system with any number of cache levels. Additionally, the techniques described herein may be utilized for access to any type of shared memory including, without limitation, parallel processing memory 204 or system memory 104 as described above. Further, the techniques may be utilized at any appropriate cache level within the cache system. The specific prefetch targets may be modified to correspond to various operating parameters such as processor speed, cache latency, number of sectors per cache line, and number of simultaneously operating threads.

Figure 6:
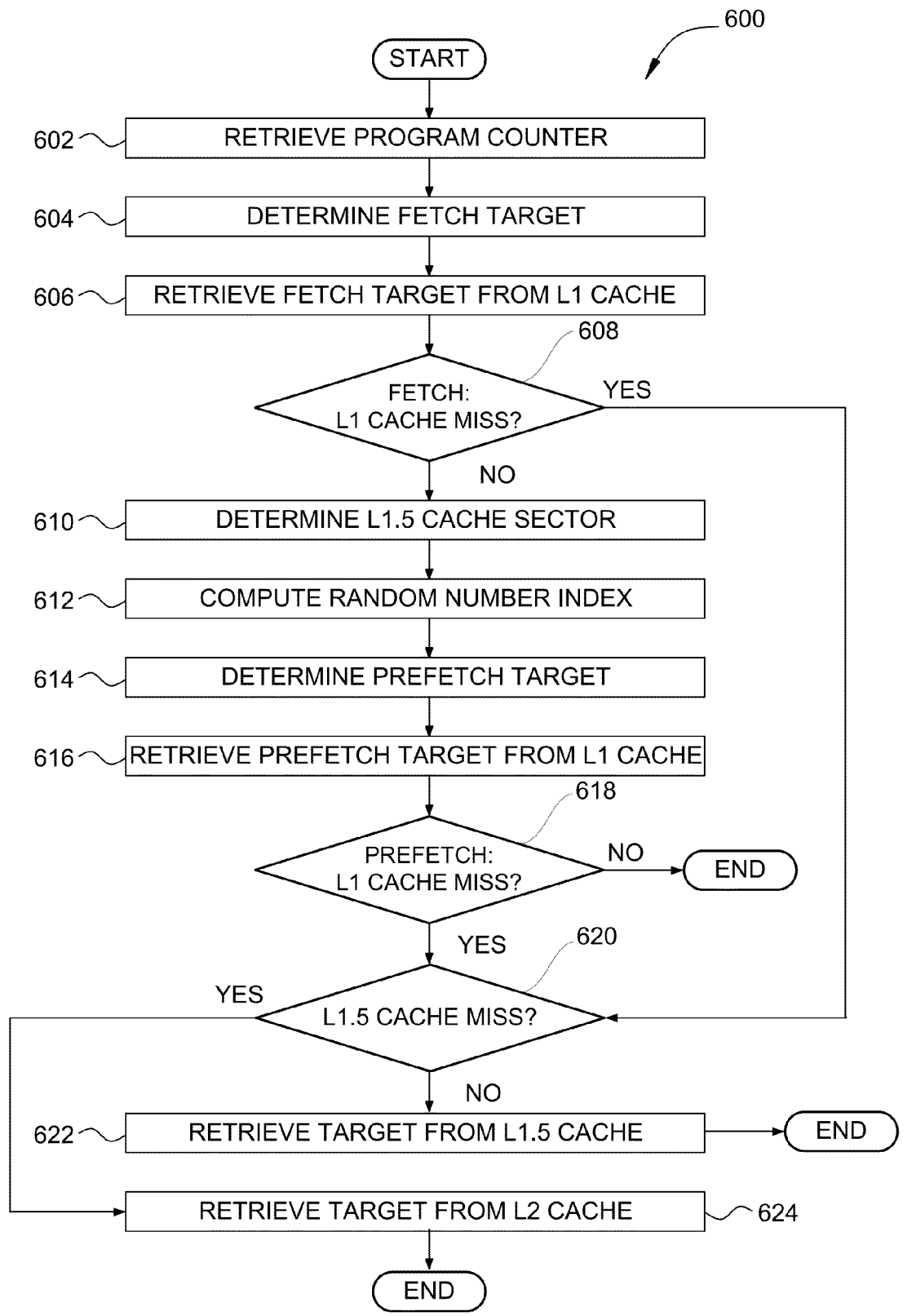
FIG. 6 is a flow diagram of method steps for prefetching instructions from a multi-level instruction cache, according to one embodiment of the present invention.

FIG. 6 is a flow diagram of method steps for prefetching instructions from a multi-level instruction cache, according to one embodiment of the present invention. Although the method steps are described in conjunction with the systems of FIGS. 1-4, persons of ordinary skill in the art will understand that any system configured to perform the method steps, in any order, is within the scope of the present invention.

The method begins at step 602, where the fetch unit 410 retrieves the program counter, which represents the memory address of the instruction currently being accessed by the processor. At step 604, the fetch unit 410 determines the fetch target. The fetch target is the instruction L1 cache 370 line where the instruction corresponding to the program counter is located. At step 606, the fetch unit 410 retrieves the fetch target from the instruction L1 cache 370. At step 608, the fetch unit 410 determines whether the fetch operation resulted in an instruction L1 cache 370 miss (that is, the fetch target is not resident in the instruction L1 cache 370). If there is an instruction L1 cache 370 miss, then the method proceeds to step 620. In this case, the fetch unit 410 cannot perform a prefetch operation because the fetch unit 410 is configured to fetch the current instruction from a higher level cache. At step 620, the fetch unit 410 determines whether the fetch operation resulted in an L1.5 cache 335 miss (that is, the fetch target is not resident in the L1.5 cache 335). If there is no L1.5 cache 335 miss, then the method proceeds to step 622, where the fetch target is retrieved from the L1.5 cache 335 at which point the method terminates. If there is an L1.5 cache miss, then the method proceeds to step 624, where the fetch target is retrieved from the L2 cache at which point the method terminates.

Returning now to step 608, if the fetch operation does not result in an instruction L1 cache 370 miss, then the method proceeds to step 610. In such a case, the fetch unit 410 attempts a prefetch operation. At step 610, the fetch unit 410 determines the L1.5 cache 335 sector represented by the current instruction L1 cache 370 line. At step 612, the fetch unit 410 computes a random number index. The random number may be generated via any technically feasible method of computing a random or pseudorandom number. At step 614, the fetch unit 410 determines the prefetch target as a function of the L1.5 cache 335 sector and the random number index, as determined in the previous two steps.

At step 616, the fetch unit 410 retrieves the prefetch target from the instruction L1 cache 370. At step 618, the fetch unit 410 determines whether the prefetch operation resulted in an instruction L1 cache 370 miss (that is, the prefetch target is not resident in the instruction L1 cache 370). If there is no instruction L1 cache 370 miss, then the method terminates. In this case, both the fetch target and the prefetch target are already resident in the instruction L1 cache 370, so the fetch unit does not access the L1.5 cache 335. If there is an instruction L1 cache 370 miss, then the method proceeds to step 620, where the fetch unit 410 attempts to retrieve the prefetch target from the L1.5 cache 335. At step 620, the fetch unit 410 determines whether the prefetch operation resulted in an L1.5 cache 335 miss (that is, the prefetch target is not resident in the L1.5 cache 335). If there is no L1.5 cache 335 miss, then the method proceeds to step 622, where the prefetch target is retrieved from the L1.5 cache 335. The method then terminates. If there is an L1.5 cache 335 miss, then the method proceeds to step 624, where the prefetch target is retrieved from the L2 cache at which point the method terminates.

In sum, the disclosed technique provides an improved way to prefetch instructions in a multi-level cache. Specifically, a pseudorandom number generator and the sector corresponding to the current instruction L1 cache 370 line are used to determine the location of the next prefetch target. The fetch unit 410 initiates a prefetch operation to transfer, for example, either one cache line ahead or two cache lines ahead according to some probability function. This prefetch target is modified by the position of the current instruction L1 cache 370 line within the corresponding L1.5 cache 335 line. If the current instruction L1 cache 370 line is located within the first sector of the corresponding L1.5 cache 335 line, then the selected prefetch target is located at a sector within the next L1.5 cache 335 line.

Advantageously, instruction L1 cache 370 lines are transferred from the L1.5 cache 335 in such a manner that the instruction L1 cache 370 contains multiple cache lines following the current execution point of the processor. The result is that the instruction L1 cache 370 hit rate is improved and instruction fetch latency is reduced, even where the processor consumes instructions in the instruction L1 cache 370 at a fast rate. Because prefetches are not fixed at two (or more) cache lines ahead of the current instruction, the fetch unit 410 does not incur a multiple cache line miss when the prefetch target misses in the L1.5 cache 335. Probabilistic prefetch targets are chosen carefully such that the fetch unit 410 not only compensates for the latency between the instruction L1 cache 370 and the L1.5 cache 335, but also compensates for the relative latency between system memory and the L1.5 cache 335. The fetch unit 410 invokes a prefetch operation for the next L1.5 cache 335 line early in the execution of the current L1.5 cache 335 line in order to compensate for this prefetch latency.

While the foregoing is directed to embodiments of the present invention, other and further embodiments of the invention may be devised without departing from the basic scope thereof, and the scope thereof is determined by the claims that follow.

What is claimed is:

1. A computer-implemented method for pre-fetching cache lines, the method comprising:
    determining a memory location within a first cache;
    generating a pseudo-random number;
    selecting a first cache line within the first cache for which to perform a pre-fetch operation, wherein the first cache line is associated with the memory location and the pseudo-random number;
    in response to a cache miss resulting from the pre-fetch operation, locating a first sector within a first cache line within a second cache, wherein the first sector corresponds to the first cache line within the first cache; and
    transferring the first sector to the first cache line within the first cache,
    wherein the memory location is associated with a second sector within the second cache, and
    wherein a distance between the first sector and the second sector is based on the value of the pseudo-random number and the position of the second sector within the second cache.

2. The method of claim 1, wherein the first cache comprises an instruction cache.

3. The method of claim 1, wherein the distance between the first sector and the second sector is one sector where the pseudo-random number is a first value; two sectors where the pseudo-random number is a second value and the second sector is in a first position within the second cache; and six sectors where the pseudo-random number is the second value and the second sector is in a second position within the second cache.

4. The method of claim 3, wherein the second sector is within a second cache line within the second cache, different from the first cache line within the second cache.

5. The method of claim 1, wherein each sector within the first cache line within the second cache is equal in size to the first cache line within the first cache.

6. The method of claim 5, wherein each cache line within the second cache is comprised of four sectors.

7. The method of claim 1, further comprising:
    determining that the first sector is not within the first cache line within the first cache and the first cache line within the second cache;
    locating the first sector within a first cache line within a third cache; and
    causing the first sector to be transferred from the first cache line within the third cache to the first cache line within the first cache.

8. The method of claim 1, wherein the first cache and the second cache share a common fetch unit.

9. A subsystem for pre-fetching cache lines, comprising:
    a first cache;
    a second cache; and
    a fetch unit configured to:
        determine a memory location within a first cache,
        generate a pseudo-random number,
        select a first cache line within the first cache for which to perform a pre-fetch operation, wherein the first cache line is associated with the memory location and the pseudo-random number,
        in response to a cache miss resulting from the pre-fetch operation, locate a first sector within a first cache line within a second cache, wherein the first sector corresponds to the first cache line within the first cache, and
        transfer the first sector to the first cache line within the first cache, wherein the memory location is associated with a second sector within the second cache, and wherein a distance between the first sector and the second sector is based on the value of the pseudo-random number and the position of the second sector within the second cache.

10. The subsystem of claim 9, wherein the first cache comprises an instruction cache.

11. The subsystem of claim 9, wherein the distance between the first sector and the second sector is one sector where the pseudo-random number is a first value; two sectors where the pseudo-random number is a second value and the second sector is in a first position within the second cache; and six sectors where the pseudo-random number is the second value and the second sector is in a second position within the second cache.

12. The subsystem of claim 11, wherein the second sector is within a second cache line within the second cache, different from the first cache line within the second cache.

13. The subsystem of claim 9, wherein each sector within the first cache line within the second cache is equal in size to the first cache line within the first cache.

14. The subsystem of claim 13, wherein each cache line within the second cache is comprised of four sectors.

15. The subsystem of claim 9, wherein the fetch unit is further configured to:
   determine that the first sector is not within the first cache line within the first cache and the first cache line within the second cache;
   locate the first sector within a first cache line within a third cache; and
   cause the first sector to be transferred from the first cache line within the third cache to the first cache line within the first cache.

16. The subsystem of claim 9, wherein the first cache and the second cache share a common fetch unit.

17. A computing device comprising:
   a subsystem that includes:
      a first cache;
      a second cache; and
      a fetch unit configured to:
         determine a memory location within a first cache, generate a pseudo-random number,
         select a first cache line within the first cache for which to perform a pre-fetch operation, wherein the first cache line is associated with the memory location and the pseudo-random number,
         in response to a cache miss resulting from the pre-fetch operation, locate a first sector within a first cache line within a second cache, wherein the first sector corresponds to the first cache line within the first cache, and
         transfer the first sector to the first cache line within the first cache, wherein the memory location is associated with a second sector within the second cache, and wherein a distance between the first sector and the second sector is based on the value of the pseudo-random number and the position of the second sector within the second cache.

18. The computing device of claim 17, wherein the distance between the first sector and the second sector is one sector where the pseudo-random number is a first value; two sectors where the pseudo-random number is a second value and the second sector is in a first position within the second cache; and six sectors where the pseudo-random number is the second value and the second sector is in a second position within the second cache.

19. The computing device of claim 18, wherein the second sector is within a second cache line within the second cache, different from the first cache line within the second cache.

20. The computing device of claim 17, wherein the fetch unit is further configured to:
   determine that the first sector is not within the first cache line within the first cache and the first cache line within the second cache;
   locate the first sector within a first cache line within a third cache; and
   cause the first sector to be transferred from the first cache line within the third cache to the first cache line within the first cache.

\* \* \* \* \*